S. WHITE.
HEAD-BLOCKS FOR SAW-MILLS.
No. 171,494. Patented Dec. 28, 1875.
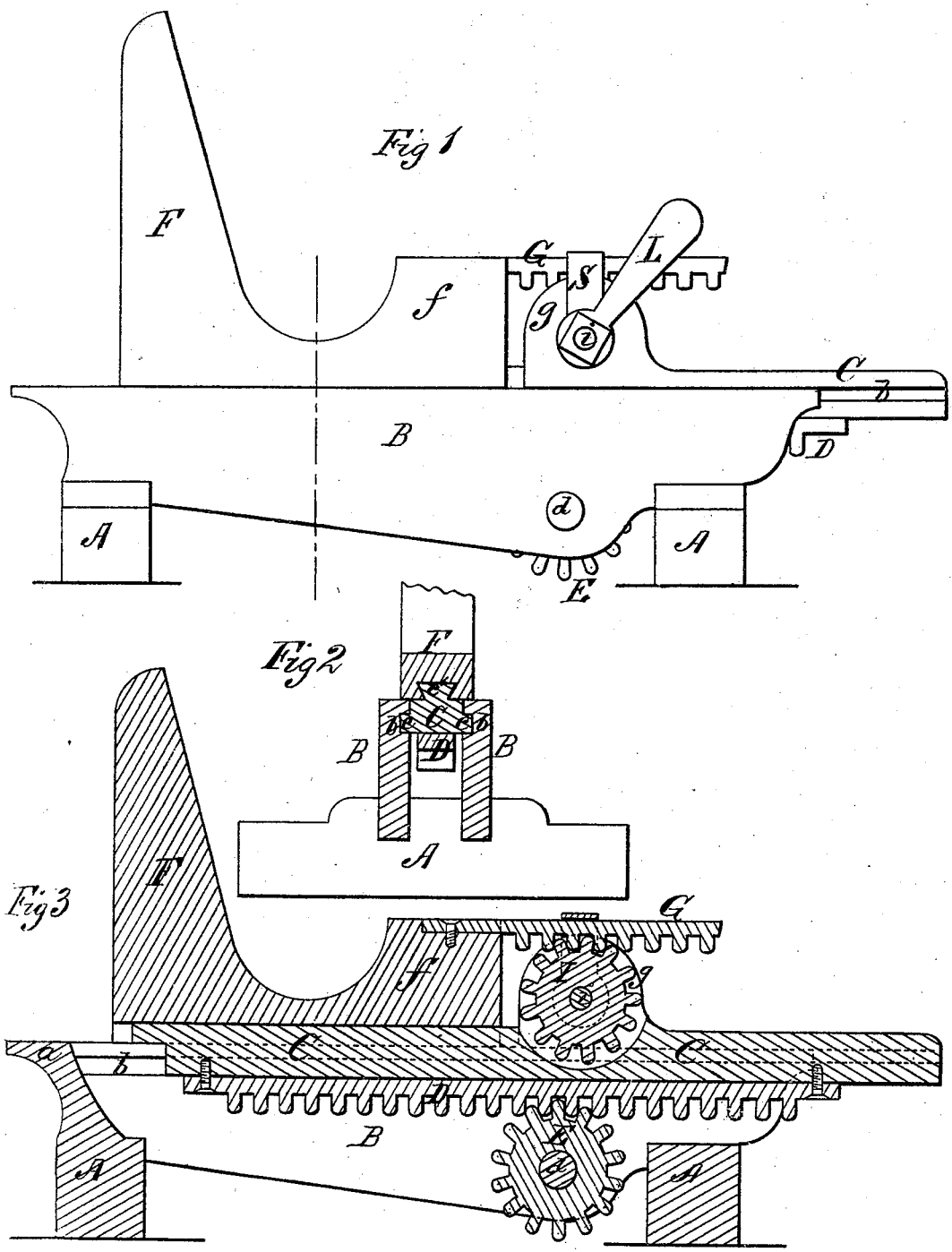

UNITED STATES PATENT OFFICE.

SAMUEL WHITE, OF EAU CLAIRE, WISCONSIN.

IMPROVEMENT IN HEAD-BLOCKS FOR SAW-MILLS.

Specification forming part of Letters Patent No. 171,494, dated December 28, 1875; application filed February 6, 1875.

*To all whom it may concern:*

Be it known that I, SAMUEL WHITE, of Eau Claire, in the county of Eau Claire and State of Wisconsin, have invented a new and valuable Improvement in Head - Blocks for Saw-Mills; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a side view of my set-block. Fig. 2 is a sectional detail view of the same, and Fig. 3 is a vertical sectional view.

This invention has relation to saw - mill head-blocks which are designed to hold a saw-log in proper position to be cut into boards by a saw.

The object of the invention is to provide a simple and trustworthy means for adjusting the log to the cutting-edge of the saw, so as to be able to obtain a board of equal thickness throughout its length, or to cut a board with tapering or converging flat surfaces of any degree of variation from the parallel cut.

To this end the nature of the invention consists in the novel construction and combination, with a slide-block arranged upon a saw-mill carriage, and capable of being adjusted to or from the saw, of a set-block, also adjustable to or from the saw, and guided in such adjustment by the said slide, whereby any thickness of cuts may be secured, or any desired degree of taper of the flat surfaces of the said cuts obtained, as will be hereinafter more fully explained.

In the annexed drawings, A designates the longitudinal bars of a saw-mill carriage, arranged in and movable upon ways to or from the cutting-edge of a saw, upon which are arranged and rigidly secured beams B, at a suitable distance apart, and with their ends next the saw closed by a block, *a*. Beams B, which are in the nature of tracks, are or may be cast, and in the latter case block *a* will be cast therewith; they are also provided, near their horizontal upper surfaces, with grooves *b*, adapted to receive a tongue, *c*, upon the edges of a movable and preferably metallic slide-block, C, having upon its under side a rack-bar, D, adapted to engage with a gear-wheel, E, having its bearings in the beams B. Shaft *d* of gear-wheel E extends a certain distance out beyond the said beams, and is designed to be operated for the purpose of actuating the said gear-wheel to force slide-block C to or from the saw by means of a suitable lever, and, when an approximate adjustment of the log has been obtained, to be locked by means of a suitable pawl and ratchet. The upper front portion of block C is provided with a dovetailed tongue, $c'$, adapted to be received within a correspondingly-shaped longitudinal groove in the under surface of a broad-based detachable set-block, F, which is thus rendered capable of being moved to or from the saws in the direction of the length of the slide, for a purpose hereinafter explained. G designates a rack-bar, of suitable construction and material, which is rigidly secured in a horizontal position, and with its teeth downward, to an elevated and enlarged part, *f*, of set-block F, as shown in Fig. 1. This rack-bar engages with a pinion, I, having its bearings in standards *g*, erected upon slide C, and is held against vertical displacement to this engagement by means of a U-shaped strap, S, applied over the ends of the trunnions *i* of the said pinions, and receiving under it the free end of the said bar, as shown in Fig. 1.

Having explained the mechanical devices employed in the construction of my improved set-block, I shall now proceed to show its advantages and mode of operation. The log is placed, in the usual well - known manner, upon the carriage, and is approximatively adjusted toward the saw by actuating wheel E, and is secured rigidly in this position, with relation to set-block F, by means of the usual hooks. This adjustment, which is only approximative, having been secured, a lever, L, applied upon the ends of shaft *i* of the pinion I, is then actuated or thrust toward the saw, thereby forcing set-block F in the same direction, thus effecting a secondary and more effective adjustment, and enabling me to cut with unerring accuracy boards of any thickness, or of any desired degree of taper.

I am aware that a saw-mill has heretofore been provided with head-blocks with independent knees, working out from the main knees, in combination with levers, pawls, pinions, and racks, as shown in Letters Patent granted to G. Selden and H. O. Kelsey, dated June 7, 1870, No. 104,068, and I therefore lay no claim to such invention.

What I claim as new, and desire to secure by Letters Patent, is—

The metallic slide-block C, having upon its under side a rack-bar, D, and provided with tongues $c\ c'$, in combination with the beam B, provided with grooves $b$, the sliding grooved set-block F, provided with the rack-bar G, and pinions I and E, all constructed to operate substantially as described, and for the purpose set forth.

In testimony that I claim the above I have hereunto subscribed my name in the presence of two witnesses.

SAMUEL WHITE.

Witnesses:
JOHN J. KEITH,
MILO B. WYMAN.